INVENTOR.
Arthur H. Albrecht

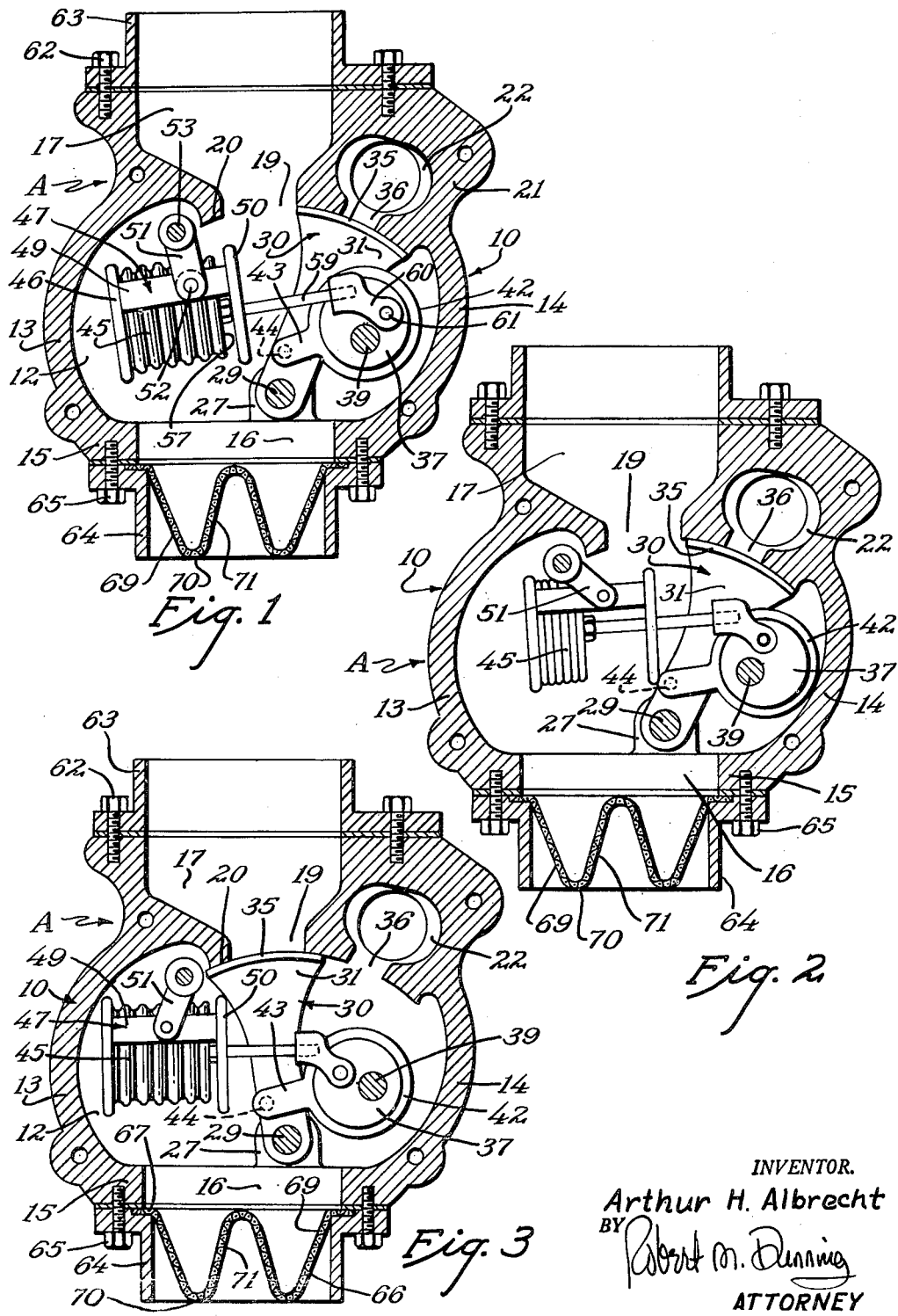

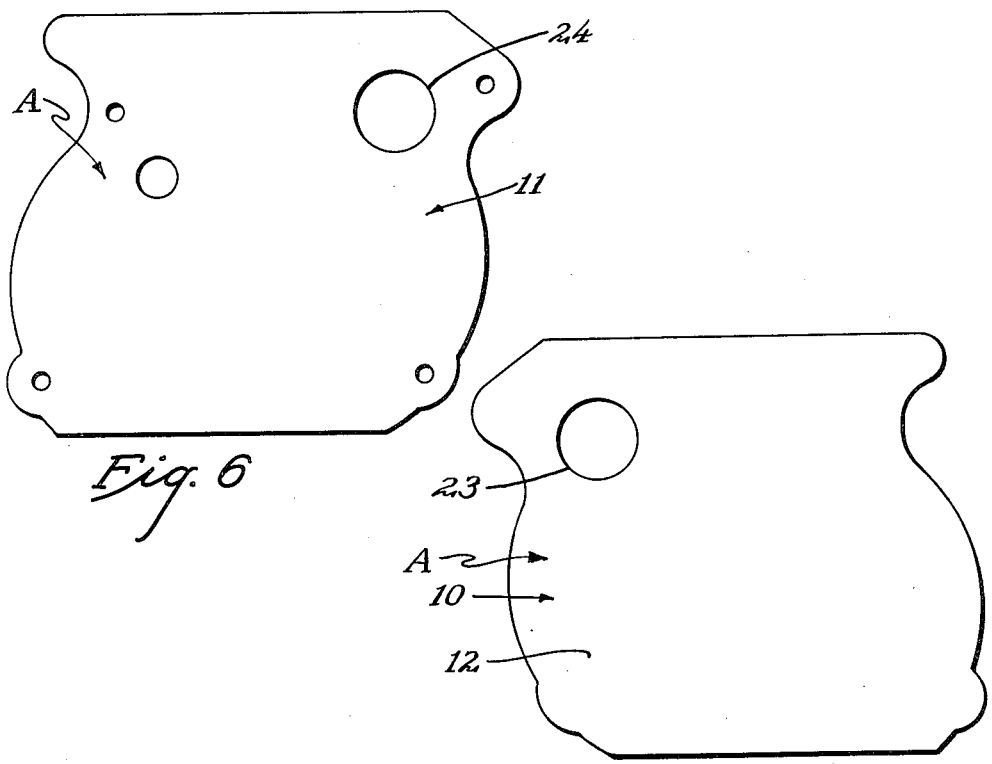
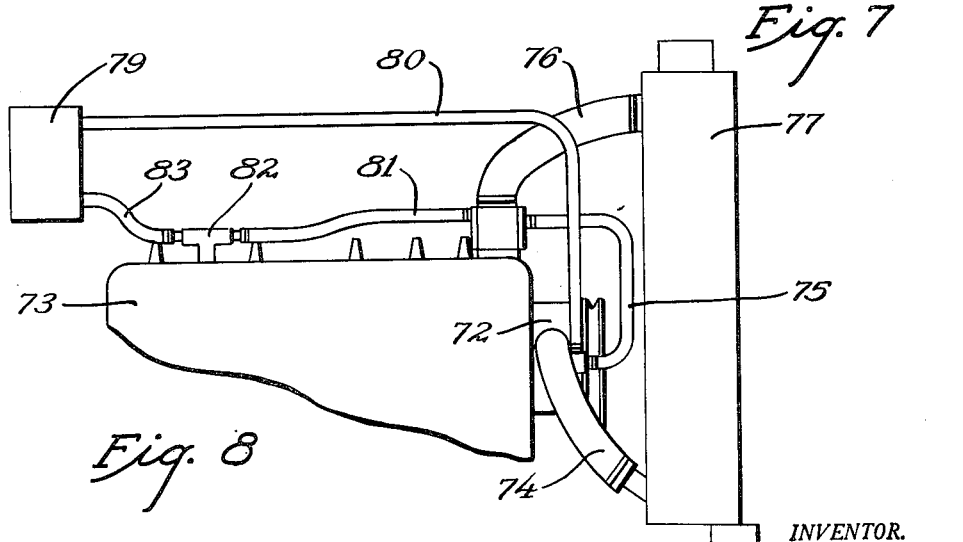

United States Patent Office 2,701,102
Patented Feb. 1, 1955

2,701,102

HEATING SYSTEM AND THERMOSTAT FOR USE WITH INTERNAL-COMBUSTION ENGINES

Arthur H. Albrecht, Minneapolis, Minn.

Application September 25, 1950, Serial No. 186,590

7 Claims. (Cl. 237—8)

My invention relates to an improvement in thermostats and deals particularly with a type of thermostat useful in controlling the flow of fluid through the cooling system of an internal combustion engine.

The cooling system of automobiles usually includes a water jacket enclosing the cylinders of the engine and a radiator for cooling the water heated in this water jacket. The system usually includes a water pump for circulating water through the system and a thermostat for blocking the circulation when the engine is cold. This water pump usually tends to withdraw water from the radiator and to circulate this cool water through the engine block. When the thermostat is closed the pump operates against a pressure. The present thermostat includes a by-pass arrangement which permits water to flow through the block and through the pump in a manner to by-pass the radiator when the engine is cold, thus preventing the building up of water pressure within the block by the water pump.

A feature of the present invention resides in the provision of a thermostat which includes a valve capable of selectively closing either of two outlet ports. One of these ports is connected to the radiator while the other is connected to the water pump. When the passage to the vehicle radiator is closed by the valve, the passage to the pump inlet is open, thus permiting a circulation of cooling fluid through the pump and through the engine block.

A feature of the present invention resides in the fact that my thermostat may be effectively used in conjunction with a vehicle heating system. The heating system may be connected to one of the outlet ports of the thermostat in such a way that when the vehicle engine is cold and the thermostat is in posiiton to prevent circulation of cooling liquid through the vehicle radiator, a portion of the liquid may be by-passed through the heater to produce more instantaneous heat.

A feature of the present invention lies in the provision of a thermostat which is provided with an expandable and contractable member sensitive to variations in temperature in the cooling system and which is bodily adjustable from a part externally of the thermostat. As a result the expandable member may be properly positioned to control the valve so as to by-pass fluid to the engine block and through the pump when the engine is cold and which will circulate the water through the radiator when the vehicle engine is warm. At the same time the expandable member may be adjusted into position to close the by-pass under proper conditions or may close the passage to the radiator in another position. Thus in the one condition the by-pass remains closed regardless of the temperature of the liquid of the cooling system and in the other condition the radiator passage remains blocked regardless of the temperature of the cooling liquid.

A further feature of the present invention lies in the provision of a filter screen of a particular type which requires a relatively small space and at the same time includes a substantial area. This screen has been found particularly desirable for use in conjunction with my thermostat.

These and other objects and novel features of my invention will be more clearly and fully set forth in the following specification and claims.

In the drawings forming a part of my specification:

Figure 1 is a vertical sectional view through the thermostat showing the connection with the heater or vehicle heating system in closed position.

Figure 2 is a view similar to Figure 1 showing the thermostat in inoperative position in which all of the cooling fluid of the vehicle engine will pass through the vehicle radiator.

Figure 3 is a cross-sectional view through the thermostat with the expandable members in the opposite extreme position from that illustrated in Figure 2.

Figure 6 is a side elevational view of the thermostat showing the cover plate on one side thereof.

Figure 7 is a view similar to Figure 6 showing the opposite side of the thermostat casing.

Figure 8 is a diagrammatic view showing a typical manner of connecting the thermostat in the cooling system.

Figure 4:
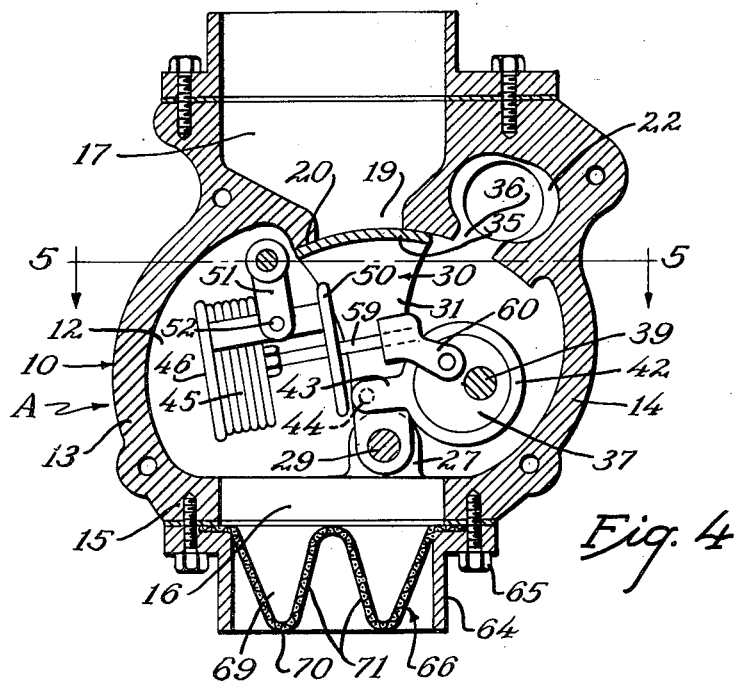
Figure 4 is a view similar to Figure 1 showing the bellows in contracted position so that all of the fluid will flow through the vehicle heating system.
Figure 5:
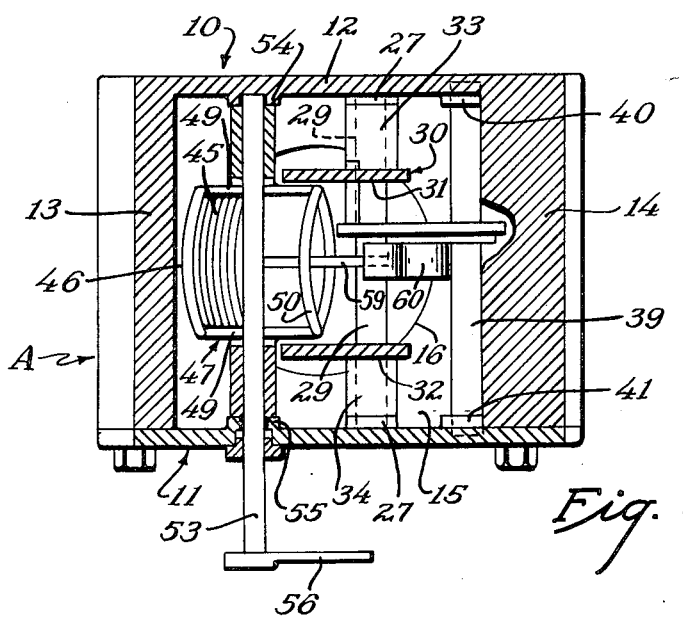
Figure 5 is a sectional view on the line 5—5 of Figure 4.

The thermostat is indicated in general by the letter A. In general it comprises a housing 10 having an open side which is normally closed by a cover plate 11. The body 10 is provided with a side wall 12 parallel to the cover plate 11 and outwardly bulged connecting walls 13 and 14. The housing includes a housing bottom 15 provided with a circular aperture 16 therein. At the top the housing includes a generally cylindrical recess 17 which communicates with a rectangular opening 19. The inner surface of the casing at the top thereof is formed along an arcuate plane as indicated at 20 so that the casing surface may act as a seat for an arcuate valve which will be later described in detail.

The casing 10 includes a transverse enlargement 21 which is provided with a transverse passageway 22 leading through the casing. This transverse passage 22 may extend through the side wall 12 of the casing as indicated in Figure 7 at 23 and either closed with a suitable plug or equipped with a threaded connection connected to the vehicle heating system or a by-pass to the pump. The closure plate 11 may also be apertured as indicated at 24 and may be either closed by a suitable plug or equipped with a threaded connection. Thus the connection with the heating system and the pump may extend from either side of the thermostat body.

A pair of bosses 27 extend inwardly from the casing wall 12 and the cover plate wall 11. These bosses 27 are socketed to enclose the ends of a shaft 29. A valve indicated in general by the numeral 30 is pivotally supported upon the shaft 29. The valve 30 includes a pair of spaced arms 31 and 32 which are connected to hubs 33 and 34 respectively which encircle the shaft 29. The arms 31 and 32 are arcuate at their outer extremity, the center of arcuation being the axis of the shaft 29. The arm ends are connected by an arcuate plate 35 which forms the actual body of the valve. As indicated in Figure 1 of the drawings, the plate 35 fits snugly against the inner surface 20 of the housing and may serve to close the rectangular passage 36 connecting the transverse passage 22 with the interior of the valve body. As indicated in Figure 3 of the drawings, the plate 35 may also close the opening 19 communicating with the thermostat port 17.

An eccentric disc 37 is mounted upon a transverse shaft 39 supported in bosses 40 and 41 projecting inwardly from the casing wall 12 and the closure plate 11. An eccentric ring 42 encircles the eccentric disc 37 and is rotatably supported thereby. The eccentric rod or arm 43 projects from the ring 42 and is pivotally connected to one or both of the valve arms 31 and 32 at 44. Thus rotation of the eccentric disc 37 will act through the ring 42 and its rod 43 to swing the valve plate 35 about the axis of the shaft 29. An expandable and contractable bellows 45 is connected at one end 46 to a supporting frame 47. The frame 47 includes frame members 49 extending longitudinally of the bellows on either side thereof and firmly connected to the base of the bellows. The frame 47 also includes a ring shaped stop 50 which limits expansion of the bellows.

The bellow frame 47 is movably supported between a pair of bellows supporting arms 51. The arms 51 are pivotally connected at 52 to the bellows frame 47. The arms 51 are supported upon a transverse shaft 53 which is supported in bosses 54 and 55 on the wall 12 and the cover plate 11 respectively. Preferably the shaft 53 extends either through the wall 12 or through the cover plate 11 and is equipped externally of the thermostat housing with a suitable adjustment arm or other similar means by which the bellows frame may be moved.

The shaft 53 is preferably provided with an arm 56 which is connected by suitable levers or by a suitable flexible connection to a control on the dash board of the vehicle. By operation of the arm 56, the bellows frame 47 may be swung from neutral position illustrated in Figure 2 of the drawings to a closed and locked position illustrated in Figure 3 of the drawings. The base of the bellows is accordingly moved by such an adjustment member.

The end 57 of the bellows 45 comprises the free end thereof which may move toward or away from the base end 46 upon contraction or expansion of the bellows. The free end 57 of the bellows is connected by a connecting rod 59 to a bracket 60 pivotally connected at 61 to the eccentric disc 37. Expansion of the bellows 45 thus tends to rotate the eccentric disc 37 in a clockwise direction about its supporting pivot 39, while contraction of the bellows 45 tends to pivot the eccentric disc 37 in a counter-clockwise direction about the pivot 39.

The upper end of the housing is connected by bolts 62 or other suitable means to a flanged fitting 63 forming a part of the fluid connection between the vehicle radiator and the engine block. This fitting 63 may comprise a nipple to which a flexible hose is connected, or may comprise any other suitable coupling for connecting the upper end of the thermostat to the vehicle radiator. A fitting 64 is detachably fastened at 65 to the lower end of the thermostat casing. This fitting 64 may be connected to a conduit leading to the engine block or the housing 10 may be directly bolted to the engine block. The aperture 16 communicates with the interior of the water jacket encircling the engine cylinders.

A screen 66 of unusual form is supported at the lower end of the thermostat between the fitting 64 of the engine block and the bottom 15 of the casing. This screen 66 includes a peripheral flange 67 to which is connected a downwardly and inwardly tapered frusto-conical frame portion 69. This frusto-conical portion 69 is connected at its lower end as indicated at 70 to an upwardly directed conical center portion 71. This particular form of screen has been found to have particularly good screening qualities in view of its large area, without extending substantially from the thermostat casing. Furthermore, the shape of the screen provides a strong and relatively rigid strainer construction.

In the operation of my thermostat, the shaft 53 is adjusted to a desired setting according to weather conditions. In the event the weather is cold and the vehicle heater is to be used, the shaft 53 is adjusted so that the arms 51 are in substantially the position illustrated in Figures 1 and 4 of the drawings. This setting comprises the normal setting for operation during normal temperatures.

With the arms 51 in the position shown in Figures 1 and 4, the bellows frame 47 is so supported that in an expanded position as shown in Figure 1 of the drawings, the valve 30 closes the passage 36 leading to the transverse passage 22 within the thermostat housing. In the contracted position of the bellows 45, the valve 30 is swung into position to close the passage 19 leading to the upper extremity of the vehicle radiator.

As the entire fluid system of the vehicle is filled with cooling liquid, the body of the thermostat remains normally filled with liquid. When the engine is not in use during cold weather, the cooling liquid will contract the bellows 45 to the position illustrated in Figure 4 of the drawings. This action rotates the eccentric disc 37 in a counter-clockwise direction swinging the valve 30 into position to close the passage 19 leading to the upper extremity of the vehicle radiator. Thus no water is permitted to circulate through the radiator. While the water pump 72 rotates as soon as the vehicle engine 73 starts into operation, the pump tends to draw liquid from the bottom of the radiator through the connection 74 and force it into the engine block. In the absence of any by-pass arrangement, this action builds up pressure in the water cooling system in the engine block as the water cannot escape from the engine block.

Thus in most conventional cooling systems including a thermostat, the pump merely builds up pressure until it ceases to function as a pump. As the water pump 72 is not of a positive displacement type, the impeller of the pump can rotate without producing a pumping action if the pump is operating against sufficient pressure.

In the present system, it will be noted that the interior of the water jacket of the engine 73 is connected through the strainer 66 to the interior of the thermostat casing 10 below the valve 30. With the valve 30 in the position shown in Figure 4, the passage 36 is open so that liquid may flow through a connection 75 to the intake of the pump 72. Thus water may flow through the by-pass passage 75 so that the pump 72 may act to circulate water through the block, the thermostat casing and the by-pass 75 without passing through the radiator. This prevents a build up of pressure in the cooling system of the vehicle and permits a more uniform heating of the cooling water.

As the temperature of the water in the cooling system increases, the bellows 45 expands, thus acting through the rod 59 and the bracket 60 to rotate the eccentric disc 37 in a clockwise direction. This action swings the valve 30 in a clockwise direction about its pivot shaft 29, gradually opening the passage 19 and gradually closing the passage 36. Thus water is gradually permitted to circulate into the radiator 77 through the hose 76, permitting the fluid to flow in similar quantity through the hose 74 to the pump inlet.

When the water in the heating system reaches the desired temperature, the valve 30 swings from the position shown in Figure 4 to the position shown in Figure 1. In this latter position the passage 19 leading to the top of the radiator 77 is fully open and the by-pass passage 22 is completely closed.

In the event the vehicle is equipped with a heating system, the heater 79 may be connected by a conduit 80 to the pump inlet to permit a circulation of fluid through the heater before the thermostat opens. The transverse passage 22 may be connected by a conduit 81 to a T connection 82 leading to the engine block. The other end of the T is connected by conduit 83 to the heater 79, thus completing the circuit. In this way the fluid forced into the engine block by the pump 72 and flowing into the thermostat casing 10 may flow both through the by-pass passage 75 to the pump inlet and through the conduit 81 leading through the T 82 and the conduit 83 to the heater 79, thus assisting the flow of fluid to the heater. The connection 81 is gradually cut off by the valve 31 as the heating system increases, but the T connection 82 still communicates with the engine block to permit a constant circulation of liquid through the heater 79.

When it is desired to render the thermostat ineffective as in warm weather, the shaft 53 is rotated to swing the arms 51 in a counter-clockwise direction as viewed in the drawings. This moves the bellows 45 into the position shown in Figure 2 of the drawings. Figure 2 shows the bellows in contracted position. However, expansion of the bellows will merely swing the valve 30 farther in a clockwise direction and will still maintain the passage 36 in closed position. It will be noted that the valve plate 35 is sufficiently wide to permit overtravel of the valve in either direction from center position.

Thus during summer weather the bellows 45 may contract and expand without closing the passage 19 to the radiator and thus interfering with the proper circulation of the cooling water.

In Figure 3 of the drawings I disclose the third position into which the bellows 45 may be moved. When the arms 51 are swung into the position shown in Figure 3, the bellows 45 is moved to the left as shown in the drawings, thus tending to rotate the eccentric disc 37 in a counterclockwise direction and swinging the valve 30 toward a position in which the passage 19 is always closed. Normal expansion and contraction of the bellows 45 will move the valve 30 without uncovering the passage 19, thus maintaining this passage closed. This position of adjustment is employed only when it is desired to heat the cooling water in a minimum amount of time, as in extremely cold weather.

In accordance with the patent statutes, I have described the principles of construction and operation of my thermostat, and while I have endeavored to set forth the best embodiment thereof, I desire to have it understood that these are only illustrative thereof, and that obvious changes may be made within the scope of the following claims without departing from the spirit of my invention.

I claim:

1. A thermostat including a casing having an inlet port and an outlet port, and an auxiliary port, a valve pivotally supported in said casing and pivotal from a position closing one of the first named ports to a position closing said auxiliary port, said valve being substantially larger in area than said ports so that the valve may travel through a substantial angularity without uncovering a selected one of said ports, an element sensitive to variations in temperature connected to said valve to actuate the same, said element actuating said valve throughout a predetermined angularity upon changes in temperature, and means adjustably supporting said last named means, said last named means being mounted to move said valve from a position closing said one port to a position closing said auxiliary port, said last named means in another position supporting said valve for movement through said predetermined angularity and continuously closing said one port regardless of changes in temperature.

2. The structure described in claim 1 and in which the last named means is operable in another position to close the auxiliary port regardless of variations in temperature.

3. The structure described in claim 1 and in which said last named means is pivotally supported within said casing.

4. A thermostat including a casing having an inlet port, an outlet port, and an auxiliary port, a valve swingably supported within said casing and swingable from a position closing one of said first named ports to a position closing said auxiliary port, an eccentric disc pivotally supported within said casing, an eccentric strap operated by said eccentric disc and pivotally connected to said valve to move said valve upon rotation of said eccentric disc, an expandable and contractable element within said casing, means on one end of said expandable element pivotally connected to said eccentric disc and rotating said eccentric disc upon expansion or contraction of said expandable member, a frame connected to the other end of said expandable and contractable members, and an arm pivotally supported within said casing and pivotally connected to said frame to adjust the position of said other end of said expandable member.

5. A thermostatically controlled heating system for use in conjunction with internal combustion engines having a liquid cooling system, a pump for circulating cooling liquid, and a radiator for cooling the liquid, the system including a thermostat having an inlet connected to the engine block to receive liquid therefrom, a thermostat outlet connected to the radiator, and an auxiliary thermostat outlet connected to the pump inlet, said thermostat including an angularly movable valve selectively controlling said outlets to direct fluid to either or both said outlets, and thermostatic means including a crank connected to said valve to move the valve toward position to close the thermostat outlet when the liquid is cold and to move the valve toward position to close said auxiliary outlet as the liquid temperature rises, and means for shifting said crank to maintain said auxiliary outlet closed irrespective of the temperature to which said thermostatic means is subjected.

6. The system described in claim 5 and including a heating radiator having an inlet connected to said auxiliary outlet and an outlet connected to the pump inlet.

7. The system described in claim 5 and including a heating radiator having an inlet connected to the said auxiliary outlet and to the engine block, and having an outlet connected to the pump inlet.

References Cited in the file of this patent

UNITED STATES PATENTS

| | | |
|---|---|---|
| 372,232 | Newman | Oct. 25, 1887 |
| 1,000,435 | Pagelsen | Aug. 15, 1911 |
| 1,223,079 | Lammert | Apr. 17, 1917 |
| 1,847,911 | Trane | Mar. 1, 1932 |
| 1,878,496 | Gulyban | Sept. 20, 1932 |
| 2,127,162 | Beauregard | Aug. 16, 1938 |
| 2,277,814 | Booth | Mar. 31, 1942 |
| 2,289,068 | Pratt | July 7, 1942 |
| 2,377,028 | Nicholas | May 29, 1945 |
| 2,395,568 | McCollum | Feb. 26, 1946 |

FOREIGN PATENTS

| | | |
|---|---|---|
| 573,250 | Germany | Mar. 29, 1933 |
| 662,977 | Germany | July 26, 1938 |

OTHER REFERENCES

Sarco: Catalog sheet A. I. A. File 29–D21, Sarco No. 140, June 1936 (2 pages).